US006818189B1

United States Patent
Adris et al.

(10) Patent No.: US 6,818,189 B1
(45) Date of Patent: Nov. 16, 2004

(54) TUBULAR REACTOR WITH GAS INJECTOR FOR GAS PHASE CATALYTIC REACTIONS

(75) Inventors: Alaa Eldin Mostafa Adris, Riyadh (SA); Friedrich Gutlhuber, Metten (DE)

(73) Assignee: Saudi Basic Industries Corporation, Riyadh (SA)

( * ) Notice: Subject to any disclaimer, the term of this patent is extended or adjusted under 35 U.S.C. 154(b) by 0 days.

(21) Appl. No.: 09/565,355

(22) Filed: May 5, 2000

(51) Int. Cl.⁷ .................. B01J 10/00; F27B 15/14; B01D 50/00

(52) U.S. Cl. .............. 422/196; 422/197; 422/198; 422/145; 422/171; 422/240; 422/200; 422/146; 422/147; 422/195; 210/761; 423/652; 423/344; 423/345

(58) Field of Search .................. 210/761; 423/652, 423/344, 345; 422/196, 197, 198, 145, 171, 240, 200, 146, 147, 195

(56) References Cited

U.S. PATENT DOCUMENTS

| | | |
|---|---|---|
| 2,518,583 A | 8/1950 | Watson |
| 2,596,299 A | 5/1952 | Simpson |
| 3,161,683 A | 12/1964 | Ciocchetti |
| 3,513,145 A | 5/1970 | Crawford |
| 3,679,651 A | 7/1972 | Kii et al. |
| 3,838,139 A | 9/1974 | Latinen |
| 3,844,936 A | 10/1974 | Newson |
| 4,011,284 A | 3/1977 | Gawne |
| 4,056,602 A | 11/1977 | Matovich |
| 4,102,652 A | 7/1978 | Vogl |
| 4,196,170 A | 4/1980 | Cemenska |
| 4,250,346 A | 2/1981 | Young et al. |
| 4,370,470 A | 1/1983 | Vidaurri et al. |
| 4,692,306 A | 9/1987 | Minet et al. |
| 4,818,495 A | 4/1989 | Iya |
| 4,818,511 A | 4/1989 | Nishi et al. |
| 4,899,003 A | 2/1990 | Manyik et al. |
| 4,981,676 A | 1/1991 | Minet et al. |
| 5,084,134 A | 1/1992 | Mattiussi et al. |
| 5,160,637 A | * 11/1992 | Bell et al. .................. 210/766 |
| 5,202,517 A | 4/1993 | Minet et al. |
| 5,229,102 A | 7/1993 | Minet et al. |
| 5,384,051 A | 1/1995 | McGinness |
| 5,583,240 A | 12/1996 | Asher et al. |
| 5,723,094 A | 3/1998 | Sunavala |

FOREIGN PATENT DOCUMENTS

GB          1 063 297 A       3/1967

OTHER PUBLICATIONS

International Search Report in PCT Appl. No. PCT/EP 01/04915 dated Dec. 12, 2001.

* cited by examiner

*Primary Examiner*—Glenn Caldarola
*Assistant Examiner*—Alexis Wachtel
(74) *Attorney, Agent, or Firm*—Kramer Levin Naftalis & Frankel LLP

(57) ABSTRACT

A continuous flow chemical reaction apparatus comprises a tubular reactor having a length and having a first fluid reactant inlet at a first end and a product outlet at a second end, said tubular reactor having a central tube/interior conduit extending lengthwise within said tubular reaction zone, said conduit having at least one injector within the length of said conduit, said injector capable of introducing a controlled amount of a second fluid reactant into said tubular reactor.

16 Claims, 7 Drawing Sheets

TUBULAR REACTOR WITH GAS INJECTOR FOR GAS PHASE CATALYTIC REACTIONS

BACKGROUND OF THE INVENTION

1. Field of the Invention

The present invention relates to an improved continuous flow chemical reaction apparatus with fluid injectors for the introduction of a reactant to a reaction zone under optimized conditions and/or under conditions which avoid explosive regimes.

2. Description of Related Art

Several publications are referenced in this application. The references describe the state of the art to which this invention pertains, and are hereby incorporated by reference.

An oxidative dehydrogenation, or partial oxidation, process is a one step conversion of light hydrocarbons to olefins and carboxylic acids. The process potentially offers many advantages over cracking and pure dehydrogenation which are extremely capital intensive and energy intensive. The conversion of saturated hydrocarbons into olefins and carboxylic acids over low temperature catalysts was disclosed by Thorstienson et al. in a report published in *Journal of Catalysis*, vol. 52, pp. 116–132 (1978).

U.S. Pat. No. 4,250,346 discloses a process for oxidative dehydrogenation of ethane to ethylene suggesting different low temperature catalyst systems. European Patent No. EP 0 518 548 A2 discloses a process for making acetic acid which comprises oxidizing ethane with molecular oxygen in a reaction zone at a pressure at least 100 psig while the reactants are in contact with a solid catalyst containing vanadium and phosphorous oxides (VPO system).

The oxidative dehydrogenation reaction, however, raises problems such as: (a) removal of the exothermic heat of reaction, (b) possible associated temperature runaway, (c) control of selectivity to desired product, and (d) limiting the formation of undesired oxygenated by-products and carbon oxides.

Another problem which is associated with oxydehydrogenation processes, as well as oxidation processes, is the limitation on the oxidant to hydrocarbon feed ratios which is. imposed by the explosive mixture formation constraint. The imperative of avoiding compositions which can lead to autoignition, deflagration and detonation compromises the ability of the process to achieve optimality of feed compositions that satisfy the stoichiometric and kinetic requirements of the reaction.

These problems have been addressed in a number of patents. Each tried to overcome one or more of the difficulties mentioned above by proposing a modified reactor system or different reactor arrangement.

U.S. Pat. No. 4,899,003 assigned to Union Carbide relates to multi-staging the reactor system where a feed gas comprising ethane and oxygen is converted over an oxydehydrogenation catalyst to a product gas comprising ethylene, acetic acid, water, ethane and carbon oxides. The product gas from each stage (other than the last stage) is cooled and a portion of the acetic acid and water is separated and oxygen is added before passing the product gas stream to the next reaction stage. Total oxygen content in the feed stream to any of the reactors was maintained below 6 mole percent with respect to the total input gaseous stream in that stage.

U.S. Pat. No. 5,583,240 assigned to SRI relates to a reactor with porous membranes to provide for the continuous addition of one reactant all along the reactor and mixing in the entire volume of the reactor to minimize or eliminate local high concentration gradients and hot spots. The other reactant is flowed through the inside of the permeation tube, which contains mixing elements. Those mixing elements were claimed to increase the yield of desired product by increasing the heat and mass transfer rates.

European Patent No. EP 546 677 A1 relates to a fluidized bed for ethane oxidation to acetic acid. The disclosed process included three key steps: (1) cooling the gaseous effluent from the reaction zone; (2) separating most of the acetic acid in liquid form from the effluent gases, leaving a gaseous stream containing nearly all of the carbon oxide contained in the effluent; (3) purging a small portion of said gaseous stream and recycling most of the gaseous stream as part of the feed to the reaction zone. Purging is intended to prevent build-up of carbon oxides in the reaction zone, while recycling serves to maintain a high proportion of carbon oxides in the reaction zone gases, thus aiding in moderating the temperature elevating effect of the highly exothermic oxidation reaction.

U.S. Pat. No. 5,723,094 relates to a chemical reactor design which provides improved micro-mixing conditions and reduced localized zones of concentration to increase reaction selectivity to desired products. The design includes a capillary tubelet positioned within and along the length of flow tubes positioned in a shell reactor and one or more distributors for distributing a first reactant into the flow tubes and a second reactant into the capillary tubes.

European Patent Publication No. 0 532 325 relates to a method and apparatus for the production of ethylene oxide. European Patent Publication No. 0 383 224 relates to a shell-and-tube reactor and method of using the same.

It would be desirable to provide a continuous flow chemical reaction system which provides optimality of feed compositions along a substantial portion of the reaction zone and satisfies the stoichiometric and kinetics requirements of the reaction while maintaining the reaction mixture within the explosive mixture formation constraint and thus avoid reactant mixtures which can lead to autoignition, deflagration and detonation.

OBJECTS OF THE INVENTION

It is an object of the invention to overcome the above-identified deficiencies.

It is another object of the invention to provide an improved continuous flow chemical reaction apparatus.

It is another object of the invention to provide an improved continuous flow chemical reaction system where a controlled amount of at least one fluid reactant is introduced into the reaction zone at more than one location.

It is a further object of the invention to provide an improved continuous flow chemical system for performing a catalytic reaction where at least one fluid reactant is introduced into the reaction zone at more than one location.

It is a still further object of the invention to provide an apparatus in which one or more of the reactants is fed in an optimized distributed fashion to meet safety and performance requirements.

It is yet another object of the invention to provide a reactor which achieves a catalyst bed temperature profile controlled by means of non-uniform reactant(s) distribution so that desired operating temperature range is achieved along the entire length of the reactor tube.

It is a still further object of the invention to provide an improved continuous flow chemical reaction system which provides optimality of reacting mixture compositions along a substantial portion of the reaction zone and satisfies the stoichiometric and kinetics requirements of the reaction.

It is a still further object of the invention to provide a reactor wherein the total overall inventory of the reacting mixture falls within an unsafe/explosive composition region, while at any given point or region within the reactor the compositional mixture is within the domain of safe/non-explosive compositions.

The foregoing and other objects and advantages of the invention will be set forth in or apparent from the following description.

SUMMARY OF THE INVENTION

The present invention relates to a process and apparatus for the controlled/optimized addition of reactant(s) in continuous flow chemical reactions, preferably oxidative dehydrogenation, partial oxidation or oxidation reactions. More specifically, the invention deals with the shortcomings of these high potential processes by the controlled addition of a reactant which is achieved by means of a central tube or interior conduit along the length of a tubular reactor. The central tube is provided with injector(s) in a specialized configuration capable of introducing a controlled amount of reactant at the injector site into the reaction zone.

The central tube is provided with an injector capable of performing two functions: (1) pressure drop control and (2) flow control. According to one preferred embodiment, the injectors allow for the introduction of a controlled amount of reactant into the reaction zone without allowing any reactant(s) to flow into the injector or the central tube from the reaction zone.

The injector comprises a combination of pressure and flow control elements and an annular injector nozzle. In a preferred embodiment, fluid from the central tube, which in most cases is oxygen, is caused to flow through a precisely sized venturi nozzle to a section of the central tube which is downstream of the annular injector nozzle. The annular injector nozzle is then fed with reactant through a bottle neck nozzle which is connected to the downstream section of the central tube fed by the venturi nozzle. The annular injector nozzle is perpendicularly and circumferentially positioned around the outside of the interior conduit or central tube.

The present design offers a high degree of controllability over the quantity of reactant injection and the locations of the points of injection by adjusting the distance between the injection points. Therefore, injection can be optimized in such a way that only the sufficient and kinetically required amount of reactant is supplied at each point and this is controlled to respond to the spatial variation of the reaction conditions (i.e., temperature, pressure and reaction mixture composition).

The apparatus is suitable for performing continuous flow chemical reactions such as oxidation, oxidative dehydrogenation and partial oxidation processes involving a reactor design characterized by controlled/optimized addition of a reactant with the objective of: (i) avoiding the explosion regime of the reactant mixture (e.g., hydrocarbon/oxidant mixture); (ii) maximizing the selectivity of the reaction to the desired product; (iii) limiting the reactor temperature gradient and therefore the threat of reaction runaway; and (iv) controlling the operating temperature of the reaction zone so that desirable temperature range is maintained over the entire zone.

According to another embodiment, an intermediate or co-feed may be injected which enhances catalyst performance or suppresses a certain poisoning effect. This provides yet another utility of the present invention.

The benefits achievable by using the present invention include the accurate control of the temperature profile along the catalyst bed by controlling the reaction extent and heat release via the quantitative and positional control of reactant addition.

The invention also enhances the catalyst productivity by introducing reactants in proportions which are not possible in conventional reactors due to the explosion regime limitation, and reaction runaway limitation.

The invention also provides a tool for designing the reaction in such a way that the production of the desired product is optimized.

The invention also allows for the adjustment of the reactant mixture composition at every point inside the reactor, as well as the reactor entrance, so that reactant mixtures within the explosion regimes can be avoided.

Furthermore, the invention improves catalyst performance by the delayed addition of a component which reverts its reduction/oxidation state or a component which remedies a catalyst poisoning situation.

DESCRIPTION OF THE PREFERRED EMBODIMENTS

One aspect of the invention relates to improved continuous flow reaction systems.

Figure 3:
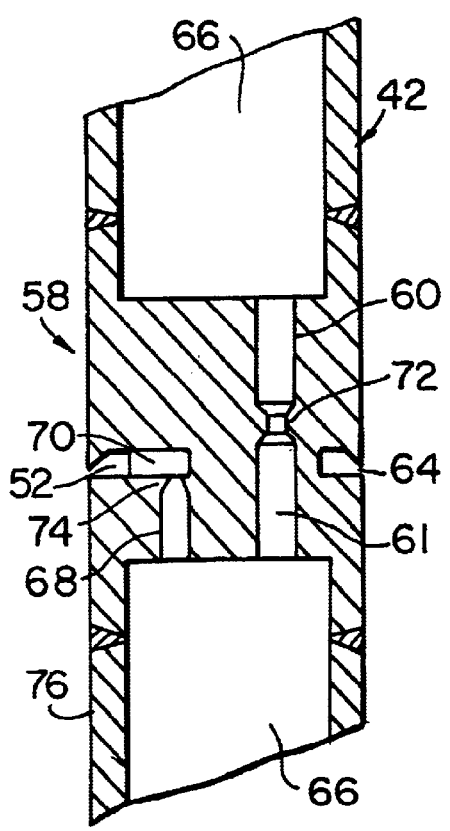
FIG. 3 shows a strongly magnified longitudinal section of a part of the inner conduit shown in FIG. 2 containing an injector according to an embodiment of the invention.

One preferred embodiment of the invention relates to multi-tubular fixed bed catalytic reactors with the novel feature of the injector similar to that described in the FIG. 3. The injector preferably satisfies two important criteria, at each point along the length of the catalyst bed: (1) pressure drop control; and (2) flow control.

Another embodiment of the invention relates to a continuous flow chemical reaction apparatus comprising a tubular reaction zone having a length and having a first fluid reactant inlet at a first end and a product outlet at a second end, the tubular reaction zone having an interior conduit or central tube extending lengthwise within the tubular reaction zone, the conduit having a multiplicity of injectors spaced apart along the length of the conduit, each of the injectors capable of introducing a controlled amount of a second fluid reactant into the tubular reaction zone.

Preferably, a portion of the second reactant is introduced with the first reactant via the first fluid reactant inlet.

Yet another embodiment of the invention relates to a continuous flow chemical reaction apparatus comprising a plurality of tubular reaction zones within a heat transfer vessel having at least one beat transfer zone, each of the heat transfer zones having a heat transfer fluid inlet and a heat transfer fluid outlet, each of the tubular reaction zones having a length, a first fluid reactant inlet at a first end, a product outlet at a second end and an interior conduit or central tube extending lengthwise within the tubular reaction zone, the interior conduit or central tube having a plurality of injectors spaced apart along the length of the tubular reaction zone and each of the injectors being adapted to introduce a controlled amount of a second fluid reactant into the tubular reaction zone. Preferably, the heat transfer vessel comprises a plurality of heat transfer zones. According to one preferred embodiment, the heat transfer vessel is a cylindrical vessel.

Preferably, the apparatus further comprises a catalyst within the tubular reaction zone(s). Advantageously, the apparatus further comprises a catalyst bed(s) within the tubular reaction zone(s) and surrounding the interior conduit(s).

According to one preferred embodiment, the interior conduit(s) or central tube(s) is concentric with the tubular reaction zone(s). Preferably, the tubular reaction zone(s) has a cross-section which is substantially circular, the interior conduit or central tube is concentric with the tubular reaction zone and the tubular reaction zone comprises a catalyst bed surrounding the interior conduit.

The apparatus of the invention comprises a plurality of injectors, preferably between 2 and 40 injectors, more preferably between 4 and 25 injectors and most preferred between 6 and 15 injectors.

According to another preferred embodiment, the apparatus further comprises a pressure drop control means in the conduit(s) proximate to at least one of the injectors.

Another embodiment of the invention relates to a continuous flow chemical reaction apparatus comprising a fluidized bed reaction zone having a height and having a first fluid reactant inlet at a lower end and a product outlet at an upper end, the fluidized bed reaction zone having an interior conduit or central tube extending vertically within the fluidized bed reaction zone, the conduit having a plurality of injectors spaced apart along the length of the conduit, each of the injectors capable of introducing a controlled amount of a second fluid reactant into the fluidized bed reaction zone.

Yet another embodiment of the invention relates to a continuous flow chemical reaction apparatus comprising a plurality of fluidized bed reaction zones within a heat transfer vessel having at least one heat transfer zone, each of the heat transfer zones having a beat transfer fluid inlet and a heat transfer fluid outlet, each of the tubular reaction zones having a height, a first fluid reactant inlet at a lower end, a product outlet at an upper end and an interior conduit extending vertically within each of the fluidized bed reaction zones, the interior conduits having a plurality of injectors spaced apart along the length of the fluidized bed reaction zones and each of the injectors being adapted to introduce a controlled amount of a second fluid reactant into the fluidized bed reaction zone.

Preferably, the fluidized bed apparatus is capable of operating in the bubbling regime. According to one embodiment, the reaction zone is a circulating fluidized bed.

Using the reaction system of the present invention, chemical reactions can be performed achieving improved yields and selectivity. The fluid flowing through the distribution member can be a single reactant component, a mixture of reacting components or a mixture of reacting component(s) and inert component(s).

Using the apparatus according to the invention, a continuous chemical reaction between at least one first fluid reactant and at least one second fluid reactant to form a reaction product by (a) continuously introducing the first fluid reactant, and preferably a portion of the second reactant, into a first end of a tubular reaction zone having a length whereby the reactants continuously flow towards a second end of the tubular reaction zone;

(b) continuously introducing the second fluid phase reactant into an interior conduit which extends lengthwise within the tubular reaction zone, the interior conduit having a plurality of injectors spaced apart lengthwise along the conduit;

(c) introducing the second fluid phase reactant into the first fluid phase reactant at a multiplicity of points along the length of the tubular reaction zone by passing controlled amounts of the second reactant through the plurality of injectors into the tubular reaction zone; and (d) providing conditions conducive to the chemical reaction in the tubular reaction zone whereby the chemical reaction proceeds and the reaction product is formed.

Another embodiment using the apparatus of the invention relates to performing a catalytic chemical reaction comprising reacting a first fluid reactant with a second fluid reactant to form a reaction product in a catalyst bed, wherein (a) the first fluid reactant is introduced into a first end of a tubular reaction zone having a length and containing the catalyst bed, the first fluid reactant flowing towards a second end of the tubular reaction zone;

(b) the second fluid reactant is introduced into a conduit within and concentric to the tubular reaction zone, the conduit having a plurality of injectors according to the invention spaced apart lengthwise along it and each of the injectors introduces a controlled amount of the second reactant into the tubular reaction zone; and (c) providing conditions conducive to the chemical reaction within the tubular reaction zone whereby the chemical reaction proceeds and the reaction product is formed.

Preferably, the tubular reaction zone(s) contains a catalyst and the first fluid reactant flows through the catalyst.

According to one preferred embodiment, the chemical reaction has a selected reaction temperature and the temperature in the tubular reaction zone(s) is maintained within 15° C. of the selected reaction temperature through at least 50% of the length of the tubular reaction zone(s). Preferably, the reaction temperature is maintained within 10° C., advantageously within 6° C. of the selected reaction temperature through at least 50% of the length of the tubular reaction zone(s).

According to another preferred embodiment, the apparatus of the invention permits a chemical reaction which has an explosive regime when the concentration of the second fluid reactant in the tubular reaction zone is at an explosive concentration, further comprising controlling the amount of the second fluid reactant introduced into the tubular reaction zone so that the concentration of the second fluid reactant is at least 70%, preferably at least 80%, more preferably at least 90%, of the explosive concentration through at least 50% of the length of the tubular reaction zone and does not exceed the explosive concentration at any point throughout the length of the tubular reaction zone.

According to one preferred embodiment, the total overall inventory of the reacting mixture falls within an unsafe/explosive composition region, while at any given point or region within the reactor the compositional mixture is within the domain of safe/non-explosive compositions.

According to one embodiment, the chemical reaction system is used for the partial oxidation of ethane to ethylene and acetic acid, and wherein the first fluid reactant comprises ethane and the second fluid reactant comprises oxygen.

According to another embodiment, the chemical reaction system is used for the partial oxidation of ethane to ethylene and acetic acid, wherein the first fluid reactant comprises ethane and the second fluid reactant comprises oxygen, and at least 10% of the ethane in the first fluid reactant is reacted to form acetic acid per single pass through the tubular reaction zone.

In the following descriptions of the figures it will be understood that tube 40 can be considered to be a tubular reaction zone and central tube 42 can be considered to be an interior conduit.

Figure 1:
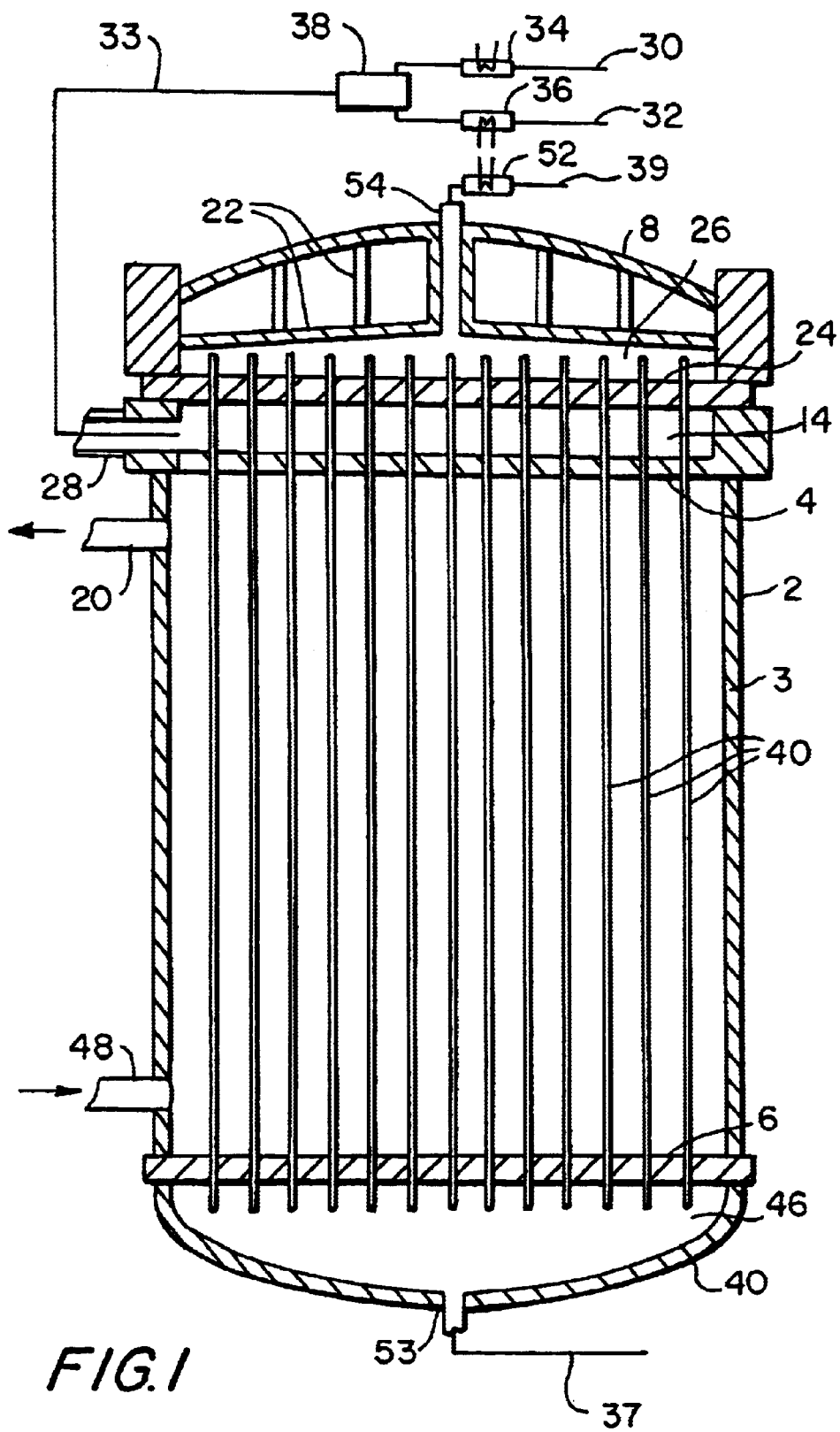
FIG. 1 shows a schematic longitudinal section through a tubular reactor with gas down-flow.

Reactor 2 shown in FIG. 1 is composed of vertical cylindrical reactor shell 3 and two tube sheets 4 and 6 confining reactor shell 3 at top and bottom, respectively, as well as two reactor heads 8 and 10 covering tube sheets 4 and 6.

A plurality or bundle of tubes 40 only suggested in FIG. 1 extends between tube sheets 4 and 6, being in connection with feed inlet chamber 14 located above upper tube sheet 4 as well as product outlet chamber 16 located below bottom tube sheet 6. Tubes 40 are fully immersed in a heat transfer fluid which is preferably liquid and which enters reactor shell 3 through heat transfer fluid inlet 18 and leaves reactor shell 3 through heat transfer fluid outlet 20. For reasons described below, displacer body 22 is installed inside the upper, i.e., inlet side reactor head 8.

One difference between a conventional tubular reactor and that represented in FIG. 1 is the presence of an additional tube sheet 24 installed above inlet side tube sheet 4. Tube sheet 24 holds the inlet ends of inner conduits 42, shown in greater detail in FIG. 2, which extend into tubes 40. Accordingly, in this design, feed inlet chamber 14 is located between the two tube sheets 4 and 24.

In FIG. 1, first reaction stream 33 is composed of two process streams 30 and 32 which are fed to a mixer 38 via separate heat exchangers 34 and 36. Heat exchangers 34 and 36 can be used to preheat process streams 30 and 32 separately according to specific process requirements. For example, process stream 30 may contain a hydrocarbon and second process stream 32 may contain air or oxygen or mixtures thereof. Mixer 38 is used to combine process streams 30 and 32 as reaction components in a way that first reaction stream 33 will be reliably just below the explosive limit at the expected temperature inside feed inlet chamber 14 and at the top of catalyst bed 44 (shown in FIG. 2). First reaction stream 33 flows into feed inlet chamber 14 of reactor 2 through reactant inlet 28.

Second reactant inlet 54 feeding chamber 26 is located centrally through reactor head 8. Likewise, the discharge of product stream 37 from product outlet chamber 16 takes place centrally through product outlet 53 through the reactor head 10. The annular region between inner conduits 42 (shown in FIG. 2) and tubes 40 are conventionally substantially filled with a suitable granular catalyst 44.

Upon contact of first reaction stream 33 with catalyst 44 (FIG. 2) inside tubes 40, a reaction starts immediately. During the reaction, the reaction component which is present in a smaller amount than required to drive the reaction to completion, usually oxygen, is consumed at least partly. Increasing the oxygen portion in first reaction stream 33 would, however, create the risk of explosion. On the other hand, additional oxygen is required to achieve a higher reaction yield.

Figure 2:
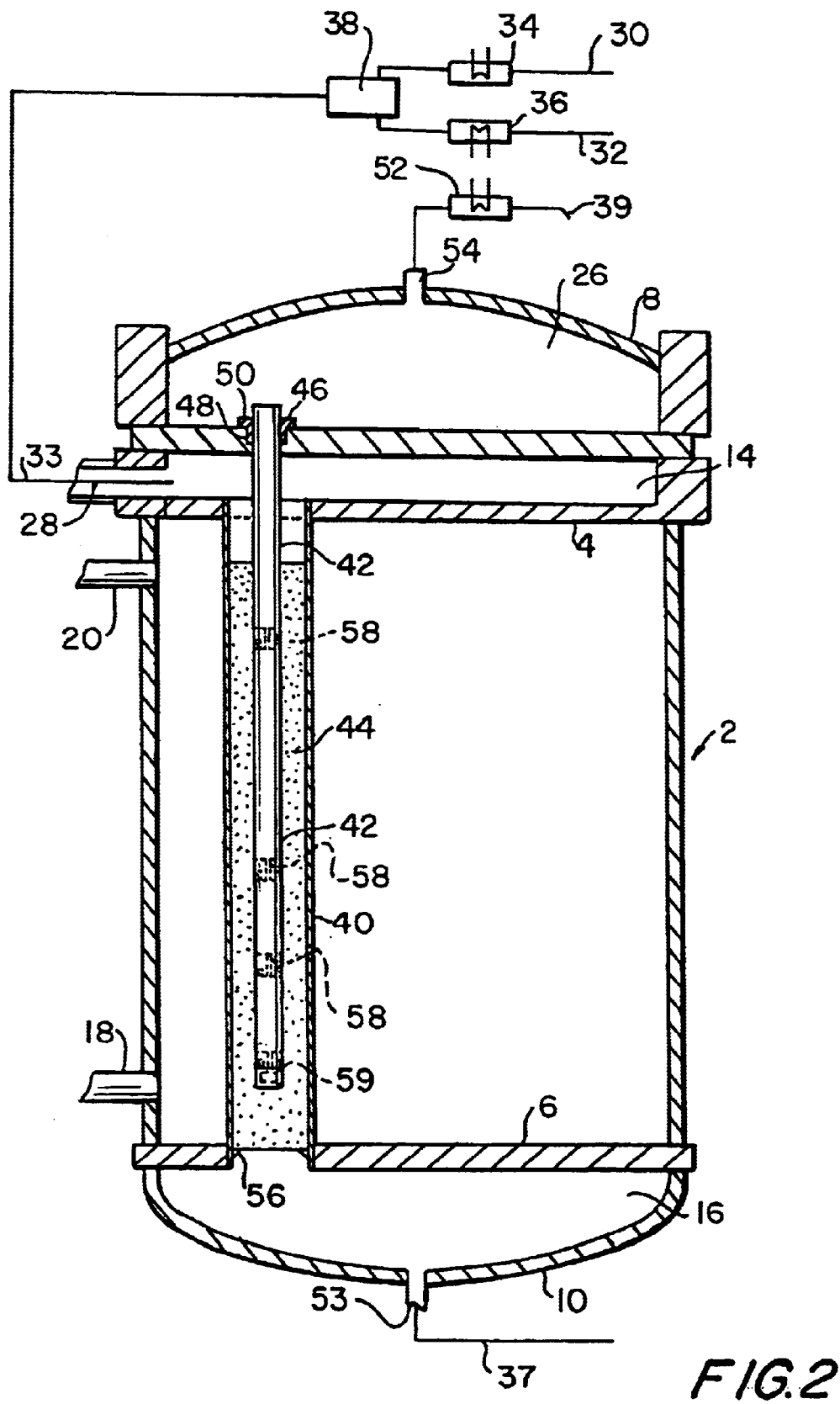
FIG. 2 shows a tubular reactor with a single reaction tube of the tube bundle contained in the reactor according to FIG. 1, with a central tube shown as a longitudinal section.

The present invention as exemplified in FIG. 2 remedies this problem by means of inner conduit 42 located inside tubes 40, each inner conduit 42 being equipped with at least one and preferably a plurality of injectors 58 and 59 for additional feed of second reactant 39. Second reactant 39 is fed to chamber 26 via a heat exchanger 52 and reactant inlet 54 on reactor head 8. Displacer body 22 (FIG. 1) inside reactor head 8 is used to minimize the residence time and amount of second reactant 39 inside inlet chamber 26 to minimize the risk of the second reactant 39 alone or in combination with other reactor feeds producing an explosive composition.

FIG. 2 shows reactor 2 having for purposes of illustration, a single tube 40 including inner conduit 42, tube sheets 4, 6 and 24, and catalyst 44 confined between tube 40 and inner conduit 42. In most commercial applications, reactor 2 would contain a plurality of tubes 40 and inner conduits 42. Tube 40 is attached, in a conventional way to tube sheets 4 and 6, such as by welding, inner conduit 42 is preferably removably sealed to tube sheet 24 by means of stuffing box 46 consisting of annular packing 48 and flange ring 50 bolted to tube sheet 24. First reaction stream 33 flows through reactant inlet 28 into feed inlet chamber 14 and then into tube 40. Second reactant 39 flows through reactant inlet 54 into chamber 26 and then into inner conduit 42.

Figure 4:
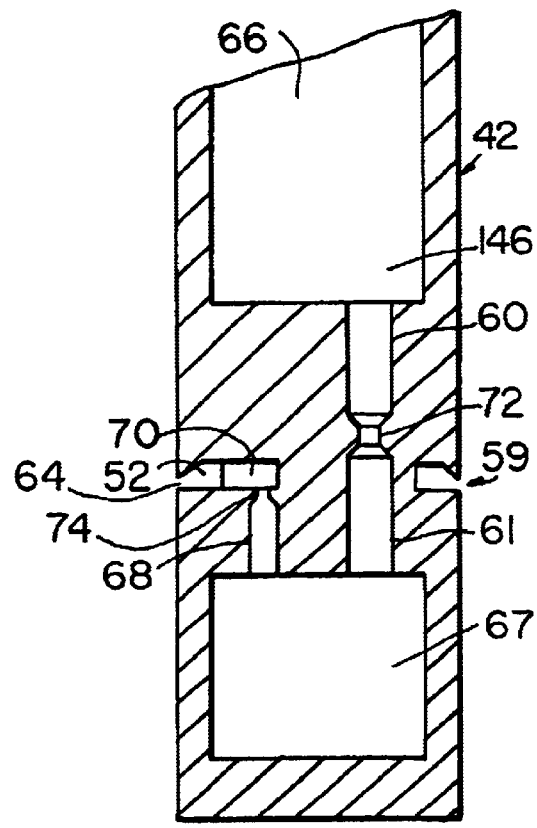
FIG. 4 shows a strongly magnified longitudinal section of a part of the inner conduit shown in FIG. 2 containing an end injector according to an embodiment of the invention.

As further shown in FIG. 2, inner conduit 42 is fitted with injectors 58 at several positions along its length. Each injector 58 containing annular outlet 64 (shown in FIG. 3). The bottom of inner conduit 42 is equipped with end injector 59, as illustrated in FIG. 4.

Central tube 42 has at least one injector 58 or 59 so second reactant 39 can be introduced at a selected position(s) in tube(s) 40 in a fully controlled way depending on the development of the reaction inside the surrounding tube 40. Generally, inner conduit 42 will extend at least over a substantial portion of the length of its surrounding reaction tube 40 and have a plurality of injectors 58. The flow of second reactant 39 through each of the injectors 58 or 59 is adjusted to provide near optimum concentration of reactants at the location of each of injectors 58 and 59.

FIG. 3 shows a strongly magnified short section of inner conduit 42 containing one injector 58. Second reactant 39 flows through fluid passage 66 in inner conduit 42. Injector 58 is in fluid communication with fluid passage 66. Second reactant 39 flows from fluid passage 66 to inlet channel 60 to venturi 72 to outlet channel 61. Second reactant 39 then flows into fluid passage 66 downstream of Venturi 72. A portion of second reactant 39 then flows through back channel 68 and bottle neck 74 to radial channel 70. From radial channel 70, second reactant 39 flows through annular channel 52 and annular ejector outlet 64 to enter the reactor zone in catalyst 44. Venturi 72 and/or bottle neck 74 are precisely sized to throttle and control the flow of second reactant 39. Venturi 72 and bottle necks 74 can be fabricated as parallel longitudinal drill holes allowing deburring at least on the gas inlet side.

The diameter of venturi 72 and bottlenecks 74 will generally vary from one injector to the next injector on inner conduit 42. The distance between injectors 58 and/or 59 on inner conduit 42 can also vary according to the requirements of the reaction being performed Injectors 58 and 59 can be manufactured separately and welded into inner conduit 42 between consecutive sections thereof.

The design of injector 58 operates to modify fluid pressure. The pressure of first reactant stream 33 drops as it flows through catalyst 44. To enable tight control of the differential pressure between the reactants and products flowing through catalyst 44 and second reactant 39 flowing through inner conduit 42 at the location of each injector 58 or 59, injectors 58 and 59 are designed to create a pressure drop through the central tube 42 corresponding to the pressure drop in catalyst bed 44.

FIG. 4 shows a strongly magnified short section of inner conduit 42 containing end injector 59. The structure of end injector 59 is essentially the same as injector 58 and parts in FIG. 4 bear the same number as like parts in FIG. 3. End injector 59 differs from injector 58 only in its substitute of dead-end chamber 67 for fluid passage 66 at the downstream end of injector 59.

Figure 5:
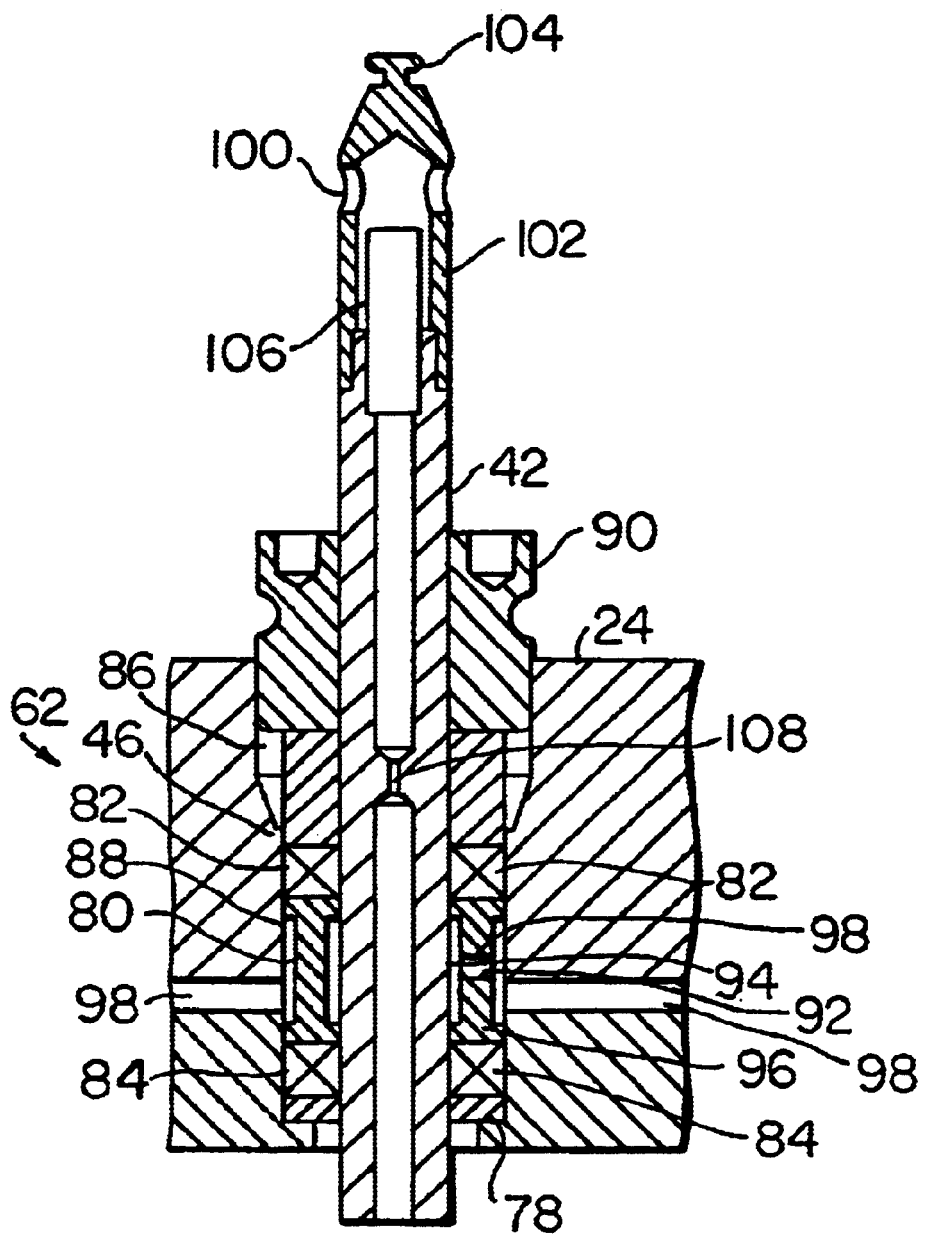
FIG. 5 shows a longitudinal section of the upper end of a preferred embodiment of the inner conduit of the invention including a pressure drop element and a sealing unit for sealing the inner conduit to a relating tube sheet.

FIG. 5 shows a preferred embodiment in a somewhat smaller scale of the upper end (gas inlet end) of the inner central tube 42 along with relating tube sheet 24 and stuffing box 46. Stuffing box 46 is equipped with two sealing packings 82 and 84 spaced from each other by a spacer bush 80 inside dead-end bore 78 drilled into the tube sheet 24 from the top. The upper end of the dead end bore 78 has a female thread 86 holding threaded plug 90 surrounding inner tube 42 and exerting pressure upon sealing packing 82 and 84 through bush 88, and compressing sealing packings 82 and 84. Spacer bush 80 has inner and outer circumferential recess 94 and 96 connected to each other by drill hole 92. Tube sheet 24 has a number of channels 98 at the same level as circumferential recess 94 and 96, which are in connection with corresponding drill holes 92. Channels 98 are provided to lead leaking reaction gas, if any, past the sealing packing 82 and 84 to a leak detection probe. This configuration also allows the introduction of inert gas under higher pressure than that of second reactant 39, to dead-end bores 78, through the channels 98 to prevent any penetration of second reactant 39 from inlet chamber 26 into the adjacent feed inlet chamber 14. As shown in FIG. 5, the gas inlet side end of the inner tube 42 can be fitted cap 102 having lateral openings 100 and ending at top in knob 104. Knob 104 can be utilized to pull inner tube 42 from its surrounding tube 40, if necessary. Additionally, cap 102 contains screen 106 which is inserted into the end of inner conduit 42. FIG. 5 shows that inner tube 42 can be given a throttle in the form of venturi 108 at its gas inlet end restricting the flow of second reactant 39 into inner conduit 42.

Figure 6:
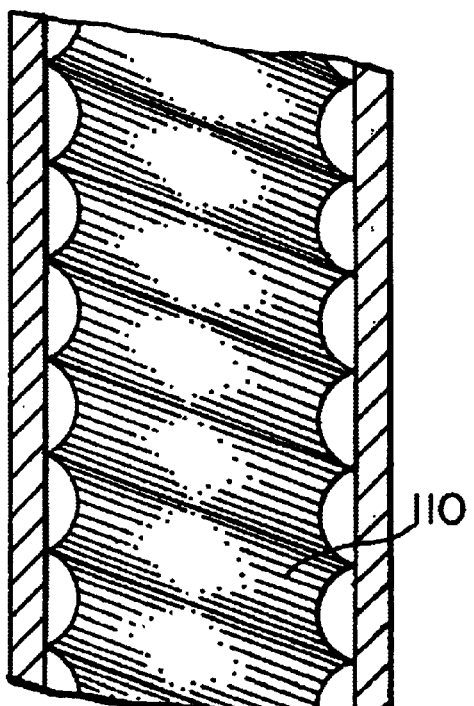
FIG. 6 shows a strongly magnified longitudinal section of a part of an inner conduit containing a spiral wound auger as a pressure drop element.
Figure 7:
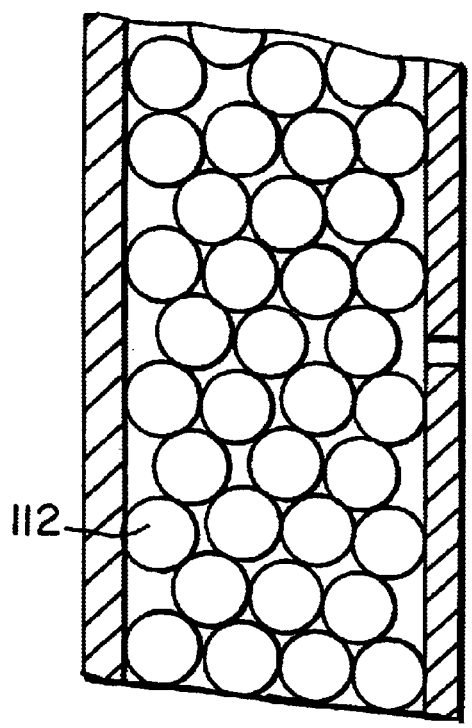
FIG. 7 shows a strongly magnified longitudinal section of an inner conduit containing pellets or granular material packing as a pressure drop clement.

FIG. 6 and FIG. 7 show two optional solutions for controlling the pressure and flow of second reactant 39 through inner tube 42, which can be provided in addition to or as a substitute for venturi tubes 72 and 108 according to FIGS. 3, 4 and 5. In one embodiment shown in FIG. 6, spindle 110 is installed instead of venturi 72 or 108. In another embodiment shown in FIG. 7, granules or pellets 112, e.g. ceramic pellets, are installed instead of venturi 72 or 108. Both the depth of the grooves and the pitch of spindle 110, as well as the size of pellets 112 can be varied, to realize differing pressure drops and fluid throughputs in different sections of inner tube 42.

Figure 8:
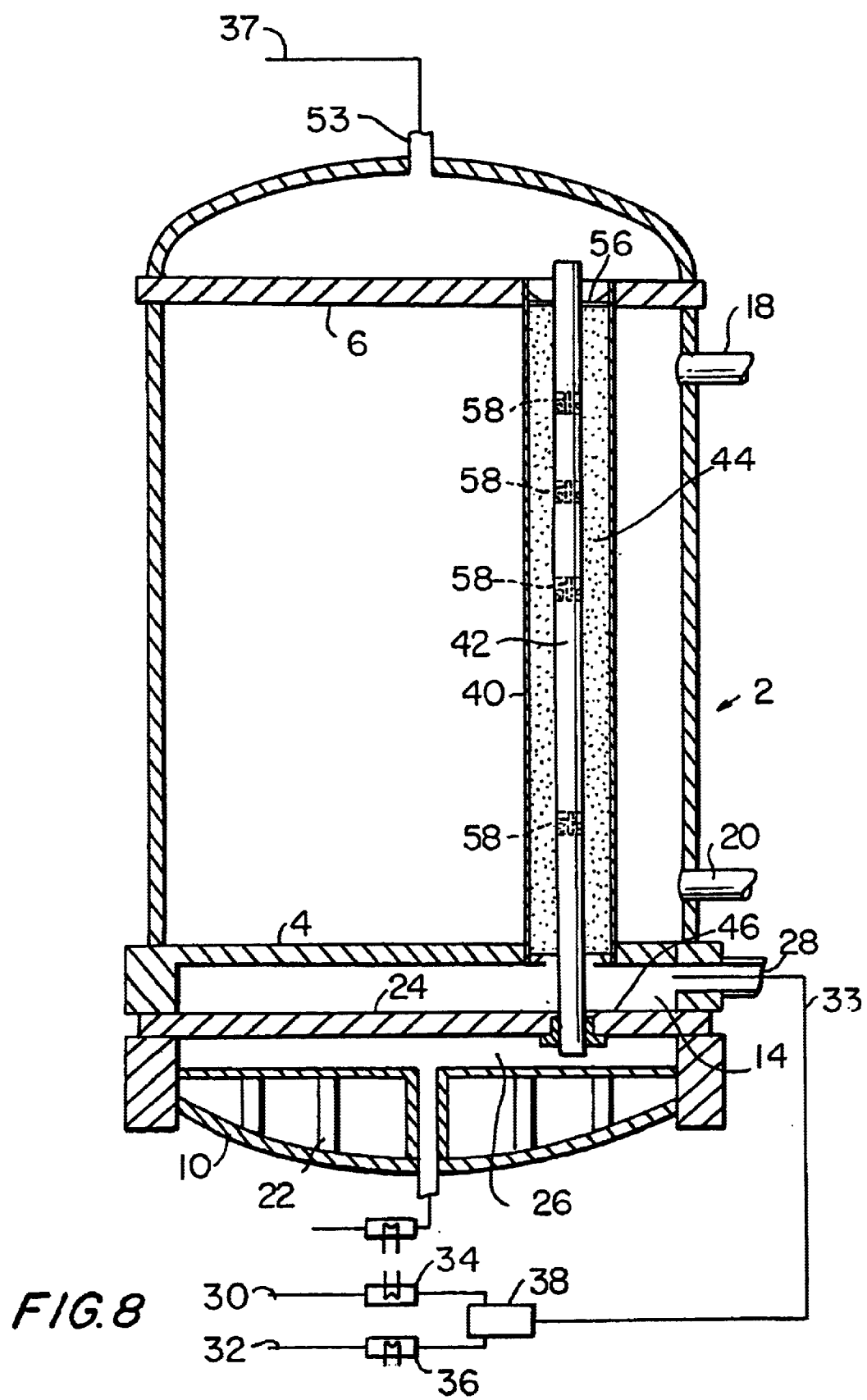
FIG. 8 shows a schematic longitudinal section similar to that of FIG. 2, through a reactor with gas up-flow and including a central tube with injectors in accordance with an embodiment of the invention.

FIG. 8 shows a tubular reactor similar to that shown in FIG. 1 but designed for bottom gas inlet. In this design, inner conduits 42 can be substantially of the same design as those described above but installed in the opposite configuration (upside down). Feed inlet chambers 14 and 26 are located at the bottom end of the reactor. Correspondingly, in this case, a displacer body 22 can be installed inside the bottom reactor head 10 to limit the capacity of feed inlet chamber 26. Optionally, coarse-grained inert pellets can be used for the same purpose. Threaded tie rods 114 (shown in FIG., 9) or the like can be used to brace the gas inlet side tube sheets, 4 and 24, to each other.

Figure 9:
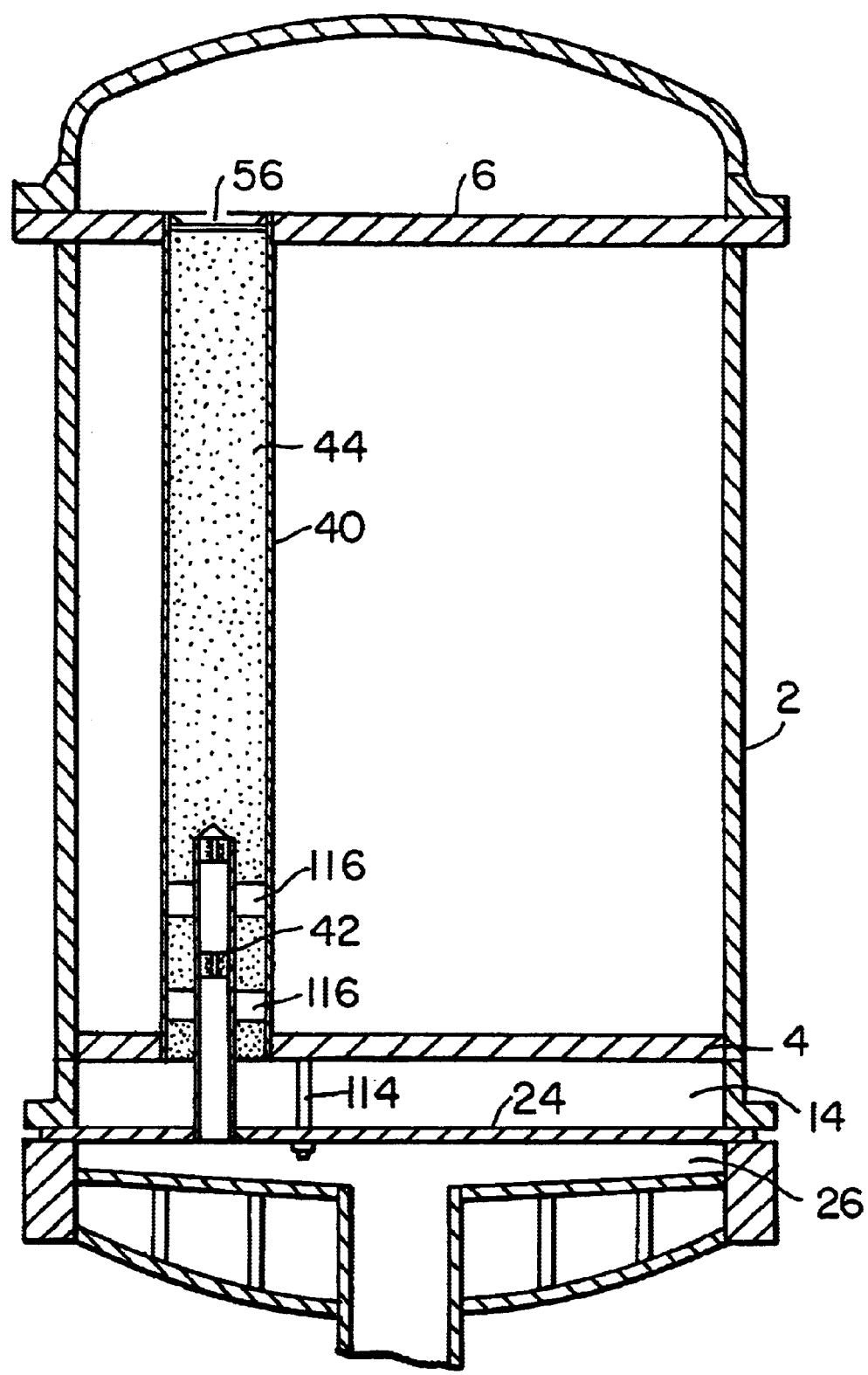
FIG. 9 shows a longitudinal section similar to that of FIG. 2 through a single reaction tube with gas up-flow including a central tube with injectors in accordance with an embodiment of the invention.

FIG. 9 shows a reactor 2 containing a single tube 40 of a larger tube bundle including such as that depicted in FIG. 1, inner conduit 42 for bottom gas inlet, which, however, can also be used for top gas inlet, in upside down position. In this embodiment, inner conduit 42 only extends over a fraction of the length of tube 40. Tube 40 is covered with screen-type catalyst retainer 56 at the level of the tube sheet 6. In this embodiment inner conduct 42 is welded to tube sheet 24. FIG. 9 also shows a radial vane-type centering devices 116 affixed to inner conduit 42 inside tube 40. For the purpose of disassembly of reactor 2 inner conduit, 42 can, if desired, be withdrawn from tube 40, together with catalyst retainer 56 and vane-type centering devices 116.

Reference is also made to copending U.S. application Ser. No. 09/565,779 (Attorney Reference Number 0080577-0060) by Adris et al. and entitled "An Apparatus for the Controlled Optimized/Addition of Reactants in Continuous Flow Reaction Systems and Methods of Using the Same" filed on even date herewith, herein incorporated by reference.

The above description of the invention is intended to illustrative and not limiting. Various changes or modifications in the embodiments described may occur to those skilled in the art. These can be made without departing from the spirit or scope of the invention.

We claim:

1. A continuous flow chemical reaction apparatus comprising a tubular reactor having a length, an inner surface, and having a first fluid reactant inlet at a first end and a product outlet at a second end, said tubular reactor having an interior conduit having an outer surface extending lengthwise within said tubular reactor, said conduit having a second fluid reactant inlet at one end and at least one injector within the length of said interior conduit, said injector capable of introducing a controlled amount of said second fluid reactant into an annular reaction zone defined between the outer surface of said interior conduit and said inner surface of said tubular reactor, wherein said injector comprises a venturi tube in said interior conduit positioned to receive said second fluid reactant, said venturi tube in fluid communication with an annular channel which is perpendicularly and circumferentially positioned around the interior conduit; said annular channel connecting to an annular orifice which is in fluid communication with said annular reaction zone.

2. The chemical reaction apparatus of claim 1, further comprising a catalyst within the tubular reactor.

3. The chemical reaction apparatus of claim 1 wherein the interior conduit has a plurality of injectors.

4. A continuous flow chemical reaction apparatus comprising a plurality of tubular reactors within a heat transfer vessel having at least one heat transfer zone, each of said heat transfer zones having a heat transfer fluid inlet and a heat transfer fluid outlet, each of said tubular reactors having a length, a first fluid reactant inlet at a first end, a product outlet at a second end and an interior conduit extending lengthwise within said tubular reaction zone, said interior conduit having a plurality of injectors spaced apart along the length of said tubular reaction zone and each of said injectors being adapted to introduce a controlled amount of a second fluid reactant into said tubular reaction zone, wherein the injectors comprise a gas penetration channel and a gas egress channel in fluid communication with the interior conduit; the gas penetration channel connected to an upstream side of the interior conduit and the gas egress channel connected to a downstream side of the interior conduit; the gas penetration channel on the end opposite to connection with the interior conduit, is connected to and contiguous with a venturi tube, the venturi tube ending in the gas egress channel; in addition to being in fluid communication with the downstream side of the interior conduit, the gas egress channel, via the downstream side of the interior conduit, is also in fluid communication with a branch channel which ends in a terminal bottle neck; at the terminal bottle neck, the branch channel is connected to a radial branch channel; the radial branch channel is in fluid communication with an annular ring channel which is perpendicularly and circumferentially positioned around the outside of the interior conduit; the annular ring channel leads to a gas outlet at an annular gap which is in fluid communication with the interior of the tubular reactor.

5. The chemical reaction apparatus of claim 3, wherein said heat transfer vessel comprises a plurality of heat transfer zones.

6. The chemical reaction apparatus of claim 3, further comprising catalyst in the interior of at least one of the tubular reaction zones.

7. The chemical reaction apparatus of claim 1, wherein said interior conduit is concentric with said tubular reaction zone.

8. The chemical reaction apparatus of claim 4, wherein said interior conduit is concentric with said tubular reaction zone.

9. The chemical reaction apparatus of claim 1, further comprising pressure drop control means in said conduit proximate to at least one of said injectors.

10. The chemical reaction apparatus of claim 4, further comprising pressure drop control means in said conduit proximate to at least one of said injectors.

11. The chemical reaction apparatus of claim 4, wherein said heat transfer vessel is a cylindrical vessel.

12. The chemical reaction apparatus of claim 1, further comprising a catalyst bed within said tubular reaction zone and surrounding said interior conduit.

13. The chemical reaction apparatus of claim 4, further comprising a catalyst bed within each of said tubular reaction zones and surrounding said interior conduits.

14. The chemical reaction apparatus of claim 2, wherein said plurality of injectors comprises between 2 and 40 injectors.

15. The chemical reaction apparatus of claim 1, wherein said tubular reaction zone has a cross-section which is a substantially circular, said interior conduit is concentric with said tubular reaction zone and said tubular reaction zone comprises a catalyst bed surrounding said interior conduit.

16. The chemical reaction apparatus of claim 4, wherein each of said tubular reaction zones has a cross-section which is a substantially circular, said interior conduits are concentric with said tubular reaction zones and each of said tubular reaction zones comprises a catalyst bed surrounding said interior conduit.

* * * * *